E. & J. KYLLONEN.
THRESHING MACHINE.
APPLICATION FILED NOV. 13, 1911.

1,053,407.

Patented Feb. 18, 1913.

Witnesses.
A. H. Opsahl.
E. C. Skinkle

Inventors
Erik Kyllonen
John Kyllonen
By their Attorneys
William Merchant

UNITED STATES PATENT OFFICE.

ERIK KYLLONEN AND JOHN KYLLONEN, OF LAKOTA, NORTH DAKOTA.

THRESHING-MACHINE.

1,053,407.

Specification of Letters Patent.

Patented Feb. 18, 1913.

Application filed November 13, 1911. Serial No. 659,893.

*To all whom it may concern:*

Be it known that we, ERIK KYLLONEN and JOHN KYLLONEN, citizens of the United States, residing at Lakota, in the county of Nelson and State of North Dakota, have invented certain new and useful Improvements in Threshing-Machines; and we do hereby declare the following to be a full, clear, and exact description of the invention, such as will enable others skilled in the art to which it appertains to make and use the same.

Our invention relates to threshing machines and has for its object to provide improved devices for more thoroughly beating or shaking the grain from the straw and thus reducing to a minimum the amount of grain carried with the straw into the stack.

Investigation will show that all threshing machines on the market carry a great deal of good grain with the straw into the stack. This is due not so much to the inefficiency of the threshing cylinder and concave as to the fact that the grain, after having been threshed out of the head is carried in considerable quantities by the rapidly moving stream or mass of straw. We prevent this waste almost entirely, by the use of a beater of novel form placed in novel arrangement in respect to the vibratory straw racks. These vibratory so-called straw racks, in the standard threshing machines are made up of laterally spaced vibratory feed bars having serrated or fishback working edges; and these bars are arranged in sets with the front and intermediate sets arranged to deliver onto the intermediate sets.

Our invention provides a rotary beater located and arranged to work at the rear end of the front or first straw rack, and it also preferably includes a second and similar beater arranged to work at the delivery or rear end of the rear or last straw rack.

In the accompanying drawings which illustrate the invention as applied to a standard threshing machine, like characters indicate like parts through the several views.

Figure 1:
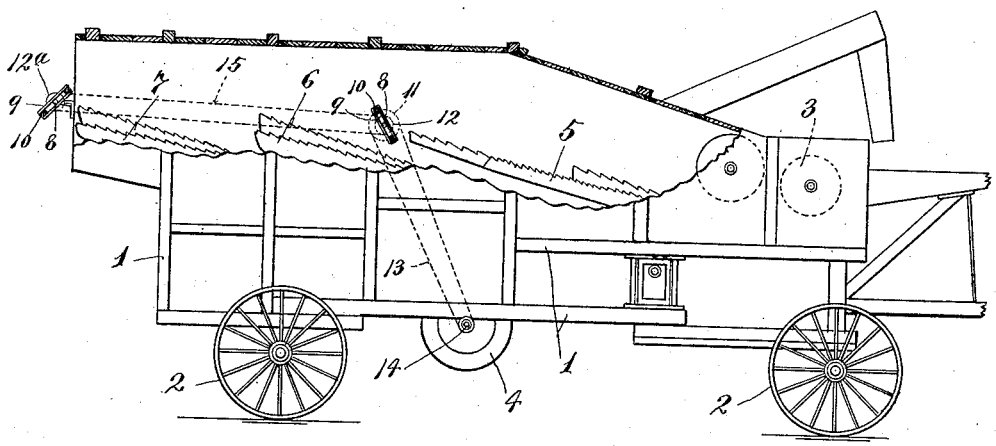
Figures 2, 3:
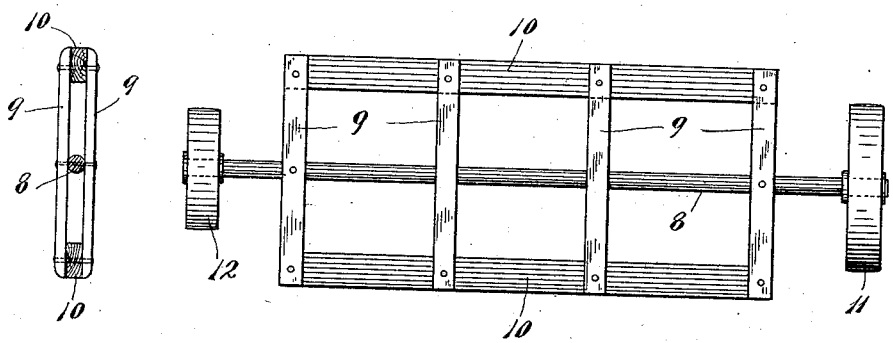

Referring to the drawings, Figure 1 is a view in side elevation showing a threshing machine with some parts broken away and some parts sectioned, and showing the beaters or agitators applied thereto, in accordance with our invention; Fig. 2 is a plan view of one of the beaters removed from the machine; and Fig. 3 is an end elevation of the beater, the shaft thereof being shown in section.

Of the parts of the threshing machine, the numeral 1 indicates the machine case, the numeral 2 the wheels, the numeral 3 the threshing cylinder, the numeral 4 the fan, the numerals 5, 6 and 7, respectively, the front, intermediate and rear vibratory straw racks made up as stated, of laterally spaced serrated bars.

The beaters provided in accordance with our invention, preferably comprise, each a shaft 8 diametrically extended arms 9 and blades or beater bars 10 secured to the outer ends of the said arms, one on each side of the said shaft. The first beater is located immediately at the rear of the delivery end of the first straw rack 5 and immediately over the receiving portion of the intermediate straw rack 6, and its shaft is journaled in suitable bearings of the sides of the case 1, and provided at one end with a pulley 11, and at its other end with a pulley 12. This first beater is driven from the fan 4 through a belt 13 that runs over the pulley 11 and over a pulley 14 on the fan shaft. The second beater, which is also preferably provided in accordance with our invention, has its shaft journaled in suitable bearings secured on the sides of the rear end of the case 1, so that the said beater works just beyond the delivery end of the last or rear straw rack 7. The shaft of this second beater is provided at one end with a single pulley 12$^a$ over which and the pulley 12, a belt 15 runs, so that the second beater is driven from the first. The fan shaft is driven in the usual or any suitable way.

When the machine is in action, the above described beaters engage the straw in the first instance as it is delivered from the first to the second straw rack, and in the second instance, as the straw is discharged from the machine, but in both instances, they severely shake up and agitate the straw so that any loose grain will have a chance to drop therefrom through the straw racks to the underlying grain pans, or sieves, or other devices provided to catch the same. The first beater, for instance, will toss the straw into the air as it passes from the first to the second straw rack, and the straw being lighter than the loose grain, the latter will be most quickly precipitated, and hence, will pass through the straw racks before it can be again caged in the body of the straw.

The shafts of the beater are journaled approximately in the extended planes of the serrated edges of the coöperating racks, and this arrangement brings the said beater into approximate alinement with the said racks twice during each rotation of the said beater. The importance of this is that a better delivery of the straw from the rack onto the beater is afforded and a maximum beating action is obtained.

It is important to note that the beaters are open or skeleton structures of such nature that the loose grain will pass therethrough when the beaters are in action, but the loose straw will not pass therethrough but will be thrown up and severely agitated by the beaters.

In practice, we have found that the above described beaters applied and used as stated, will effect very great saving of grain, and practically eliminate the waste of grain.

The beaters may be applied to all standard threshing machines at very small cost.

What we claim is:

In a threshing machine, the combination with straw racks made up of serrated bars with the rear ends of the bars of the one rack overlapping the front ends of the bars of another rack, of a flat rotary beater arranged for action directly on the straw at a point where the same passes from one rack to another and over said beater, the said beater being of open structure through which loose grain may pass, and comprising a shaft having diametrically extending arms intermediately secured thereto and diametrically opposite beater bars secured to the ends of said arms, said shaft being journaled in approximately extended planes of the serrated edges of the said overlapping racks, and so arranged as to bring said beater into approximate alinement with the serrated edges of the said overlying rack twice during each rotation of the shaft, substantially as described.

In testimony whereof we affix our signatures in presence of two witnesses.

ERIK KYLLONEN.
JOHN KYLLONEN.

Witnesses:
C. N. FRECH,
GEORGE D. KELLEY.

Copies of this patent may be obtained for five cents each, by addressing the "Commissioner of Patents, Washington, D. C."